Nov. 6, 1951     H. W. HAPMAN     2,573,905
SLUDGE REMOVING SYSTEM
Filed Nov. 20, 1946     3 Sheets-Sheet 1
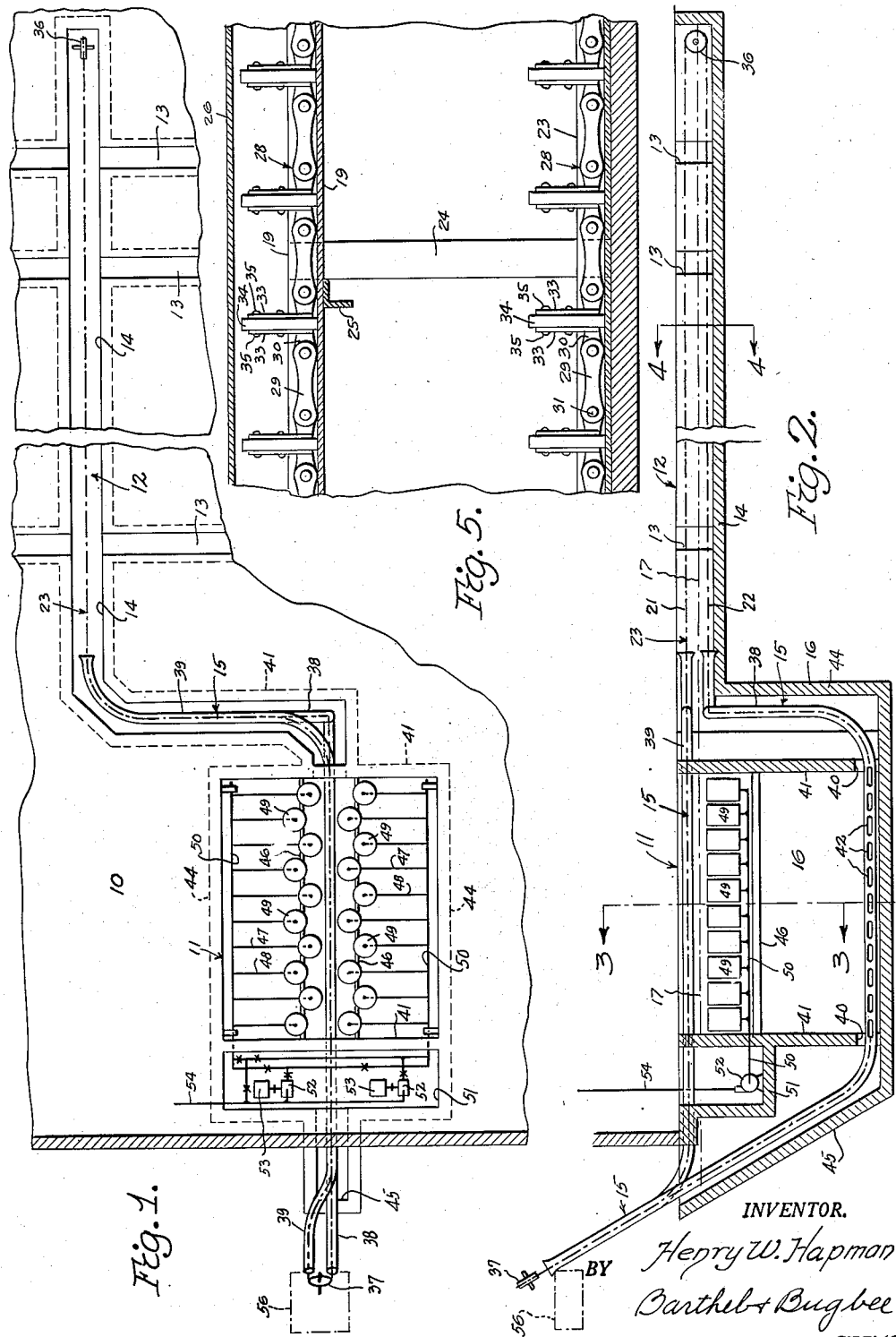
INVENTOR.
Henry W. Hapman
BY Barthel & Bugbee
ATTYS

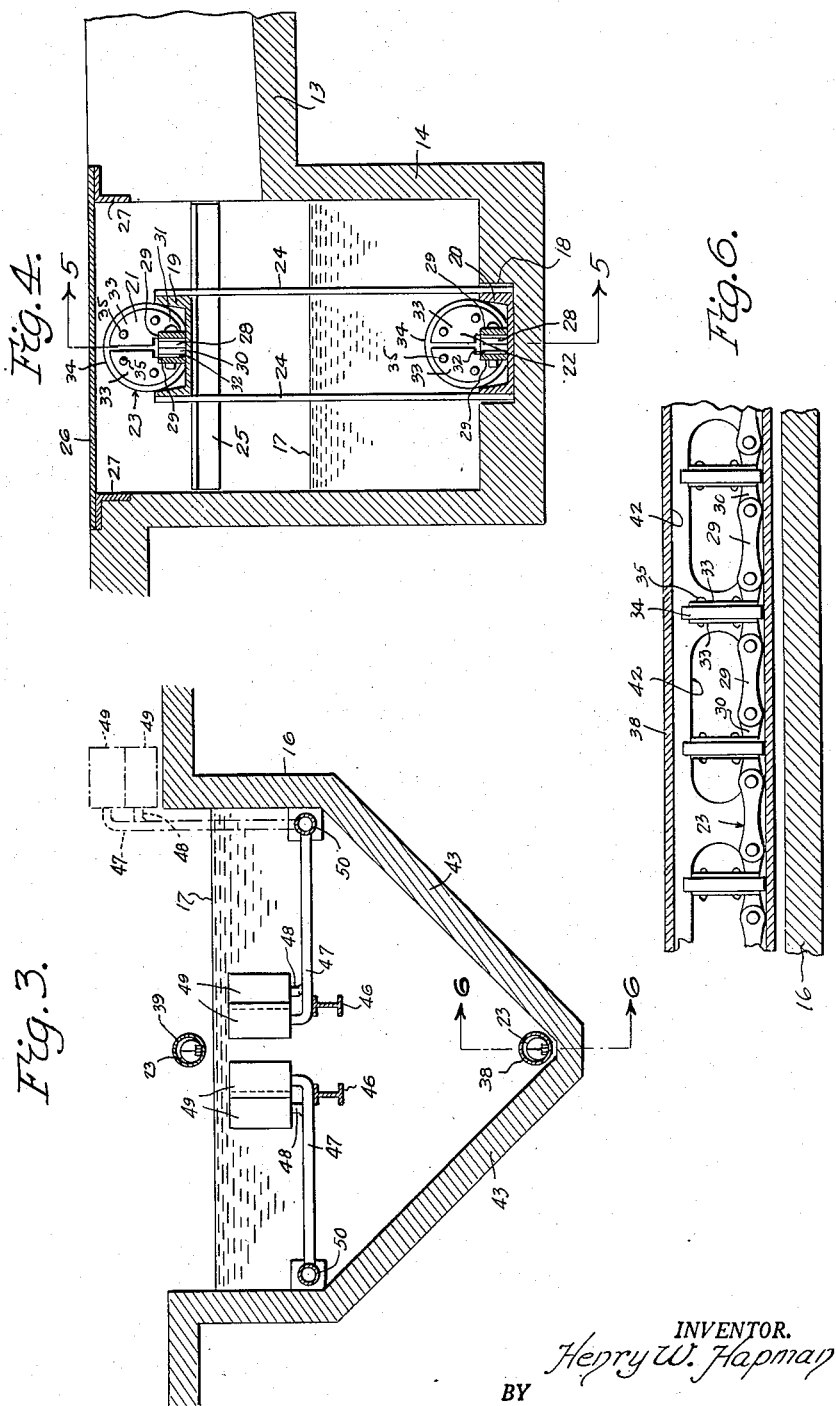

Nov. 6, 1951
H. W. HAPMAN
2,573,905
SLUDGE REMOVING SYSTEM
Filed Nov. 20, 1946
3 Sheets—Sheet 3
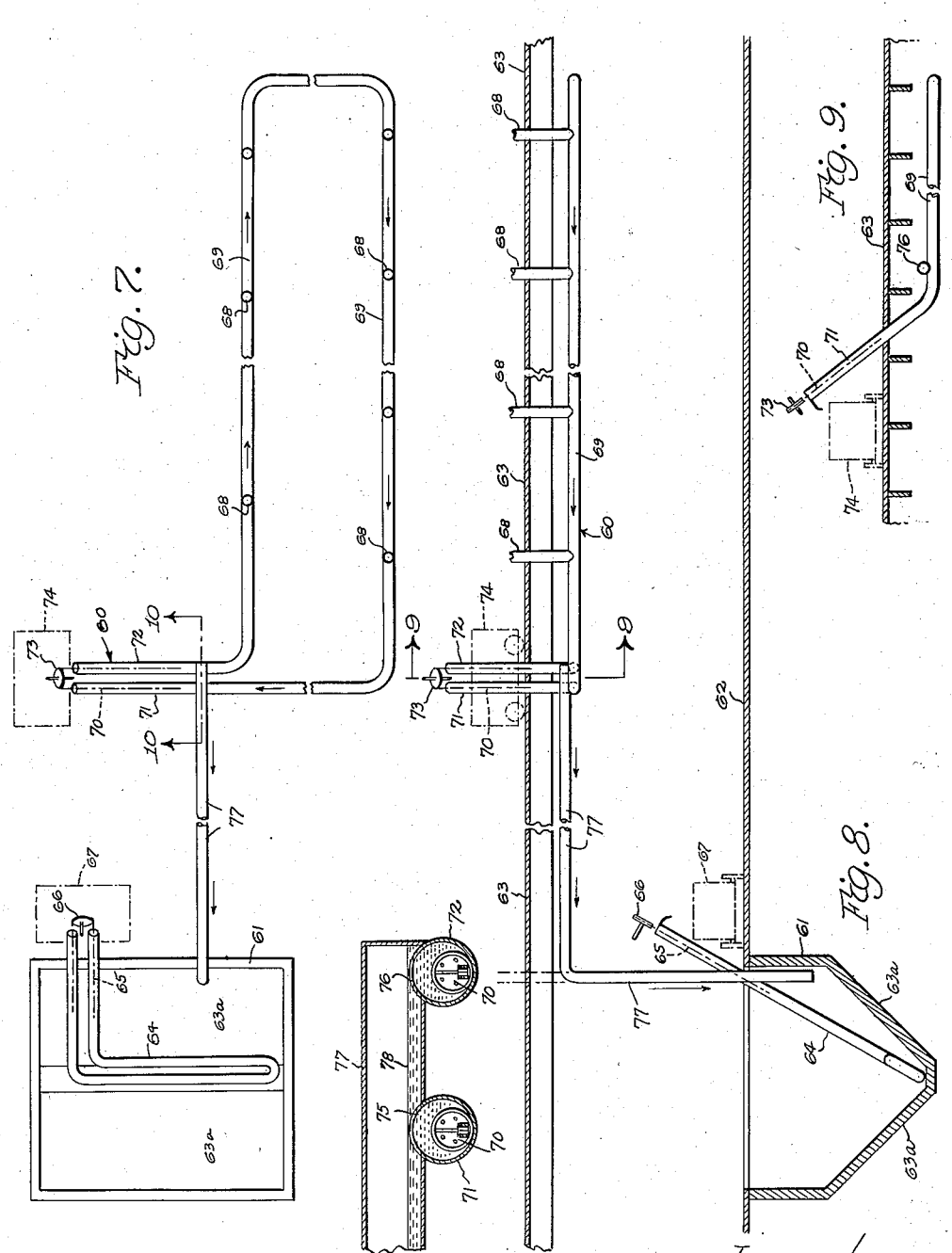
Inventor
Henry W. Hapman
by
Barthel + Bugbee
ATTYS Patented Nov. 6, 1951

2,573,905

UNITED STATES PATENT OFFICE 2,573,905

SLUDGE REMOVING SYSTEM

Henry W. Hapman, Detroit, Mich., assignor, by mesne assignments, of forty per cent to Hannah J. Hapman, Detroit, Mich.

Application November 20, 1946, Serial No. 711,071

2 Claims. (Cl. 210—55)

This invention relates to systems and devices for removing sludge from liquids.

One object of this invention is to provide a system for removing sludge from a liquid circulating in a feeder conduit leading to a settling tank, wherein the feeder conduit is arranged to have the same liquid level as the settling tank and mechanism is provided for picking up the sludge settling in the feeder conduit and conveying it to a suitable disposal receptacle, thereby adding the capacity of the feeder conduit to the capacity of the settling tank and reducing the size otherwise necessary for the settling tank.

Another object is to provide a system for removing sludge from a liquid, as set forth in the preceding object, wherein the conveying mechanism also moves through the settling tank to remove the sludge deposited therein and convey it to the disposal receptacle.

Another object is to provide a system for removing sludge from a liquid, as set forth in the preceding objects, wherein filtering devices are arranged in the settling tank to further purify the liquid therein from which the sludge is settling out.

Another object is to provide a system for removing sludge from a liquid as set forth in the preceding objects, wherein the conveyor consists of an endless flight conveyor which moves slowly through the bottom of the feeder conduit so as to pick up the sludge therein, and which thereafter preferably moves also through the settling tank to additionally pick up the remaining sludge settling out of the liquid flowing to the settling tank from the feeder conduit.

Another object is to provide a system for removing sludge from a liquid, wherein the settling tank is spaced on a floor below the machines which are served by the feeder conduit.

Another object is to provide a system for removing sludge from a liquid circulating in a feeder conduit adjacent one floor or level of a building to a settling tank located on a floor or level below that of the feeder conduit whereby the sludge settling in the feeder conduit is removed therefrom by means of a flight conveyor passing therethrough while the liquid which is thereby partially freed from the sludge flows down to the settling tank located on the level or floor below the feeder conduit.

Another object is to provide a system for removing sludge from a liquid, as set forth in the object immediately preceding, wherein the sludge settling in the settling tank is removed by a conveyor moving through the settling tank and is deposited in a suitable disposal receptacle.

Other objects and advantages of the invention will become apparent during the course of the following description of the accompanying drawings, wherein:

Figure 1 is a diagrammatic top plan view of a sludge removal system, according to a preferred form of the invention, wherein the settling tank and feeder conduit are located on substantially the same level;

Figure 2 is a vertical section through the sludge removal system shown in Figure 1, taken substantially along the axis of the flight conveyor moving through the system;

Figure 3 is a vertical cross-section through the settling tank shown in Figures 1 and 2, taken along the line 3—3 in Figure 2;

Figure 4 is a vertical cross-section through the feeder conduit taken along the line 4—4 in Figure 2;

Figure 5 is a vertical longitudinal section through the feeder conduit, taken along the line 5—5 in Figure 4;

Figure 6 is a vertical longitudinal section through the flight conveyor conduit at the bottom of the settling tank, taken along the line 6—6 in Figure 3;

Figure 7 is a diagrammatic top plan view of a modified sludge removal system, wherein the settling tank is located on a floor or level a considerable distance below the feeder conduit;

Figure 8 is a diagrammatic side elevation, partly in section, of the modified sludge removal system shown in Figure 7;

Figure 9 is a vertical cross-section taken along the line 9—9 in Figure 8, showing the flight conveyor for removing the sludge from the feeder conduit; and Figure 10 is an enlarged vertical cross-section along the line 10—10 in Figure 7, showing the connection of the liquid return conduit to the feeder conduit and the conveyor therein.

In prior sludge removal systems, it has been customary to collect the sludge in small sumps or in steeply-pitched feeder conduits and to pump it quickly and rapidly to a settling tank before the sludge has an opportunity to settle out of the liquid to any great extent. Such systems, when used for removing metallic particles from a coolant liquid, however, have been subject to the disadvantage that the sludge settles rapidly in the feeder conduits despite vigorous efforts to remove it rapidly. Under such circumstances, it has been necessary to shovel out the sludge from the feeder conduits at intervals in order to prevent clogging of the system. It has also been necessary to provide an exceptionally large settling tank and filtering devices of high capacity to remove the sludge from the liquid in the settling tank. The result has been that the expense of such an installation has been excessive and the cost of maintenance likewise very expensive. Furthermore, where the system was used to remove sludge from a coolant liquid, and the latter is of the usual animal oil composition, the coolant liquid circulates so rapidly that it heats up rapidly in the settling tank, causing bacteria to flourish, with consequent deterioration and spoilage of the liquid. The shovelling out of the sludge which collects in the feeder conduits of prior systems is also a very dirty task, especially in summertime, and is accompanied by the creation of offensive odors. The cost of providing and maintaining the pumps for pumping the liquid has also been excessive in prior installations, since it has been necessary to pump the sludge along with the liquid before it settles out.

In the sludge removal system of the present invention, these disadvantages are eliminated by deliberately providing for the settling out of sludge not only in the settling tank but also in the feeder conduits, and providing a flight conveyor system which will remove the sludge from the feeder conduits as rapidly as it settles in the conduits. The feeder conduits are preferably placed on the same level with the upper portion of the settling tank, so that the same liquid level is maintained in both, thereby adding the liquid capacity of the feeder conduits to that of the settling tank. This enables the settling tank itself to be made of much smaller capacity than in prior installations, where the settling tank had to accomplish substantially the entire task of sludge removal.

Furthermore, since a portion of the sludge is removed from the liquid while it is still flowing through the feeder conduits, much less sludge remains in the liquid when it reaches the settling tank than in prior installations, thereby requiring a smaller filtering capacity for the filtering devices in the tank. In this way, both the first cost and maintenance cost of the present system is considerably less than those of prior installations, offensive odors are eliminated or greatly reduced, and the manual removal of sludge from the feeder conduits is done away with. Since the combined volume of the feeder conduits and the settling tank of the present invention is larger than the capacity of prior settling tanks alone, for similar conditions, the liquid circulates more slowly and hence is cooler when it reaches the settling tank. The formation of bacteria is thus retarded as compared with previous installations and spoilage is reduced, thereby enabling the liquid to be used for a longer period of time than in prior installations.

Moreover, since the present invention accomplishes a part of the settling out of the sludge in the feeder conduits, the liquid reaching the settling tank contains much less sludge and consequently, a smaller filtering installation is necessary as compared with prior sludge removal systems. The first cost and upkeep cost of the system is therefore still further reduced by the present system.

Single-level sludge removal system

Referring to the drawings in detail, Figures 1 to 6 inclusive show a sludge removal system, generally designated 10, according to the present invention, where the component parts of the system are located on the same level. The sludge removal system 10 consists generally of a settling and filtering unit 11 and a feeder conduit system 12, the latter being divided into tributary conduits 13 leading from individual machines or sources of sludge-containing liquid (not shown) to a main sludge-contaminated liquid collection conduit 14. A typical installation consists of a number of machine tools, such as grinding machines employing a coolant liquid, the liquid after use flowing through the tributary conduits 13 into the main conduit 14. The conduits 13 and 14 may be tubular or may consist of open trenches of concrete, steel or other suitable material. The tributary conduits 13 are preferably as short as possible and steeply pitched so that the liquid containing the sludge flows as quickly as possible into the main conduit 14 before settling takes place.

The main conduit 14 contains an endless flight conveyor unit generally designated 15 for removing the sludge which settles out therein. The endless conveyor also preferably passes through the sludge tank 16 which forms a part of the settling and filtering unit 11 so that a single flight conveyor unit 15 serves both the main conduit 14 and sludge tank 16. From Figure 2 it will be seen that the main conduit 14 is of greater length but shallower than the settling tank. The sludge tank 16 and main conduit 14 are so arranged (Figure 2) that the level of the top of the liquid 17 is the same in both, so that the capacity of the main conduit 14 is added to that of the settling tank 16 for settling purposes. The main conduit 14 may be of any suitable length and path, either straight or zigzag, depending upon the nature of the machine layout which it serves. In order to serve a layout containing a number of machines as shown in Figure 1, the collection conduit 14 has a length exceeding the length of said tank, and is disposed on a level with the upper portion of said tank, as shown in Figure 2. For purposes of illustration (Figure 1) the main conduit 14 has been shown as a straight trench into which the tributary conduits 13 feed at right angles, but any arrangement thereof may be made, according to the conditions encountered.

The main conduit 14 (Figure 4) into which the tributary conduits 13 feed, when consisting of a concrete trench, may be provided with a recess or groove 18 at the bottom thereof for receiving the lower course of the flight conveyor unit 15. The latter is preferably made removable. When so constructed, it may consist of upper and lower channel members 19 and 20 respectively for carrying the upper and lower courses 21 and 22 of the flight conveyor, generally designated 23 which forms the conveying portion of the flight conveyor unit 15. The channel members 19 and 20 are interconnected by uprights 24 (Figure 4) welded or otherwise secured thereto. The lower channel member 20 rests in the groove 18 and the upper channel member 19 and uprights 24 are provided with side angle members 25 welded or otherwise secured thereto at intervals. The side members 25 prevent the conveyor unit 15 from tipping over and their outer ends rest against the vertical side walls of the main conduit 14 for this purpose. The conveyor unit 15, however, may be removed from the main conduit 14 merely by removing the cover member 26 (Figure 4) which is preferably a grating resting upon the angle members 27 at the top of the main conduit 14.

The flight conveyor 23 is of any suitable type, the type shown being that disclosed and claimed in my co-pending application Serial No. 676,546 filed June 13, 1946, for Flight Conveyor. The conveyor 23 consists of an endless conveyor chain 28 having outer and inner links 29 and 30 respectively interconnected by pivot pins 31. Secured to the chain 28 are the bent ends 32 of semi-circular clamping plates 33 between which are clamped disc-like flights 34 of rubber or rubber-like material, as by the fasteners 35 (Figures 4 and 5). The flights 34 are arranged to one side of the chain 28 rather than symmetrically thereon. The chain 28 at its end passes over sprockets 36 and 37 (Figures 1 and 2) at the opposite ends of its run, at least one of these sprockets being driven by any suitable source of power (not shown). As disclosed in my above-mentioned co-pending application Serial No. 676,546, filed June 13, 1946, the flights 34 and clamping plates 33 are loosely connected to the links 29 and 30 by providing enlarged holes and excessive clearances for the fasteners 35 and pivot pins 31. Accordingly, during operation, as a result of these loose fits, the conveyor chain twists longitudinally as it traverses bends in the conveyor conduit or passes around sprockets, so that the weight of the chain causes it to rest on the bottom of the conveyor conduit on both its upper and lower courses, as shown in Figure 5, with the flights 34 extending upward.

At the point where the conveyor 23 approaches the settling tank 16, it enters a tubular conduit 38 and the portion returning from the settling tank 16 emerges from a tubular return conduit 39, these being bell-mouthed to facilitate passage of the conveyor 23. The tubular conduit 38 passes downward to the bottom of the settling tank 16 and runs along the bottom thereof through openings 40 in partitions 41 before ascending at the opposite side of the settling tank 16. Along the bottom run, the tubular conduit 38 is cut away as at 42 (Figures 2 and 6) so as to permit the sludge settling out in the tank 16 to enter the conduit 38 and be conveyed onward by the conveyor 23. The side walls 43 of the settling tank 16 are inclined toward one another (Figure 3) so as to facilitate the descent of the sludge toward the conduit 38. The end walls 44 may be vertical and the end wall 45 inclined (Figure 2) so as to facilitate the entrance and the emergence of the conduit 38.

Extending between the partitions 41 in the settling tank 16 are I-beams 46 which serve to support the inner ends of swinging pipes 47 and 48 (Figure 3) which in turn support filtering devices 49. The latter are conventional and their details form no part of the present invention. The filtering devices 49 are staggered in their arrangement within the tank 16 so that the pipes 47 are longer than the pipes 48. Both pipes, however, are connected at their outer ends to rotatable conduits 50. By this construction, the pipes 47 and 48 and their filtering devices 49 may be swung upward above the liquid level 17 and out of the settling tank 16 for cleaning or servicing, as shown by the dotted lines in Figure 3.

The portion of the settling tank 16 adjacent the inclined end wall 45 is provided with a pump enclosure 51 which contains pumps 52 driven by motors 53 (Figure 1). The pump enclosure 51 is, of course, dry and sealed off from the remainder of the settling tank 16 so that liquid cannot enter except through the pipes 50, which are connected to the pumps 52. The discharge pipe 54 is connected to the outlets of the pumps 52 and leads to the machines or other devices utilizing the filtered liquid. In order to carry away the sludge removed from the liquid by settling in the main conduit 14 and settling tank 16, a sludge bucket or car 56 may be placed beneath the sprocket 37 (Figures 1 and 2) at the upper ends of the conduits 38 and 39.

*Operation of single-level sludge removal system*

In the operation of the single level sludge removal system (Figures 1 to 6 inclusive), the machines or other sludge producing devices discharge their sludge containing liquid into the tributary conduits 13 from whence it flows into the main conduit 14. The liquid moves slowly along the conduit 14 since it has the same liquid level 17 as the sludge tank 16, flow taking place as the pumps 52 remove liquid from the settling tank after it has been filtered by the filtering devices 49, and it is returned to the machines through the liquid discharge pipe 54.

As the liquid moves slowly along the main conduit 14 toward the settling tank 16, the heavier portions of the sludge therein settle to the bottom of the conduit 14. Any sludge settling in the portion of the main conduit 14 immediately adjacent the sludge tank 16, after the flight conveyor 23 enters the conduit 38, is removed by providing openings (not shown) in the latter similar to the openings 42 (Figures 2 and 6). As the flight conveyor 23 moves through the main conduit 14, its lower course 22 picks up the sludge at the bottom of the conduit and conveys it into the conduit 38 and thence downward into the settling tank 16 and along the bottom thereof. As the conveyor 23 passes through the bottom portion of the conduit 38, it also takes up the sludge which has settled in the bottom of the settling tank 16 and which has passed through the holes 42. The conveyor 23 picks up this additional sludge, along with the sludge which it has already picked up in the main conduit 14, and carries it upward out of the settling tank 16 along the inclined end wall 45 (Figure 2) and discharges it into the sludge bucket or car 56.

The return course 21 of the flight conveyor 23, after passing around the drive sprocket 37, traverses the conduit 39 and emerges into the upper portion of the main conduit 14, moving along the channel member 19 until it reaches the sprocket 36. It then passes downward around the latter and moves along the channel member 20 in the groove 18 completing its cycle and again commencing to pick up and convey sludge in a new cycle.

Meanwhile, the liquid, which has been freed from the heavier portions of its sludge as it passes through the portions of the main conduit 14, reaches the settling tank 16 and is subjected to the action of the filtering devices 49. The filtered liquid is then withdrawn from the settling tank 16 through the filtering devices 49 by means of a pump 52 and discharged through the pipe 54 to the machine. The speed of the conveyor 23 is adjusted so that it moves rapidly enough to have some reserve capacity for sludge remaining when it enters the settling tank 16 after picking up the sludge which has settled in the main conduit 14.

*Multiple-level sludge removal system*

The modified sludge removal system, generally designated 60 shown in Figures 7 to 10 inclusive follows the same general principles as the single level system 10 shown in Figures 1 to 6 inclusive, except that it is intended to serve machines or other sources of sludge-bearing liquid which are located on floors or levels above the settling tank. It is inconvenient to mount settling tanks above the ground level, except in buildings especially constructed to sustain the great weight thereof and for such installations, the modified system of Figures 7 to 10 inclusive has been devised. For purposes of simplification the system is shown in these figures as applied to an installation one floor above the settling tank, but it will be obvious that it can equally well serve several floors, if desired.

The multiple level system 60 is provided with a settling tank 61 sunk below the level of the ground floor 62, whereas the machines or other sludge-producing devices are located on an upper floor 63. The settling tank 61 has inclined side walls 63 similar to the side walls 43 of the settling tank 16 in Figure 3, and is similarly provided with filtering devices, which are omitted for purposes of simplification. A loop-like bent conduit 64 of similar construction to the conduit 38 and containing a flight conveyor 65 similar to the flight conveyor 23, traverses the conduit 64 which is provided with openings (not shown) similar to the openings 42 for admitting sludge. The flight conveyor 65 is provided with a drive sprocket 66 connected to a suitable source of power (not shown) and discharges its sludge into a sludge bucket or car 67.

The machines or other sludge producing units on the upper floor 63 are provided with tributary conduits 68 leading downward through the floor 63 to a loop-like main conduit 69 of tubular form supported in any suitable way such as by brackets (not shown) secured to the underside of the floor 63. A flight conveyor 70 similar to the flight conveyor 23 of Figures 1 to 6 inclusive traverses the main conduit 69 and emerges at the top of its upwardly inclined ends 71 and 72 to pass around a drive sprocket 73 connected to a suitable source of power (not shown). Beneath this is arranged a sludge bucket or car 74.

The major portion of the main conduit 69 is in the form of a horizontal loop and near the location where its end portions 71 and 72 start to incline upward is provided with openings 75 and 76 (Figure 10) to which is connected a liquid discharge conduit 77. The latter is likewise supported in any suitable way, such as from the underside of the floor 63, and extends downward into the settling tank 61 sunk below the floor 62.

*Operation of multiple-level sludge removing system*

The operation of the multiple level sludge removal system 60 (Figures 7 to 10 inclusive) is similar in principle to that of the single level system (Figures 1 to 6 inclusive). The sludge producing devices, such as machines, discharge their sludge containing liquid through the tributary conduits 68 into the main conduit 69, where settling of the heavier particles of sludge takes place in a manner similar to that occurring in the main conduit 14 as previously described. The main conduit 69 is of considerably larger diameter than the flights of the flight conveyor 70 which traverses it, hence the flight conveyor 70 moves slowly along the bottom of the conduit 69 until it climbs the inclined portion 71 and arrives at the sludge bucket or car 74, dumping the sludge which it has collected into the latter. The liquid which has been freed from its heavier sludge by the settling occurring in the main conduit 69, passes through the opening 75 in the upper side of the conduit portion 71, and enters the return conduit 77, the liquid level 78 in which is slightly above the top of the conduit 69 (Figure 10).

The liquid containing the lighter particles of sludge moves downward through the conduit 77 into the settling tank 61 where the remaining particles of sludge are either settled out and removed by the flight conveyor 65 in the conduit 64 or by the filtering devices (not shown) in the tank 61, similar to those previously described and shown in connection with the settling tank 16. The sludge settling to the bottom of the settling tank 61 along the inclined bottom walls 63 thereof and picked up by the flight conveyor 65 in the conduit 64 is discharged into the sludge bucket or car 67 and removed.

What I claim is:

1. A sludge collection and removal apparatus comprising a sludge settling tank, a sludge-contaminated liquid collection conduit disposed externally of said tank on a level with the upper portion of said tank and having a length exceeding the length of said tank, said collection conduit extending from a sludge-collecting location remote from said tank to a connection with said tank, a sludge discharge conduit extending upwardly out of said tank to a sludge disposal station disposed externally of said tank, and a single endless flight conveyor mounted in said conduits and tank and extending through said collection conduit downwardly through the lower portion of said tank and upwardly through said discharge conduit to said sludge disposal station and returning to said collection conduit.

2. A sludge collection and removal apparatus comprising a sludge settling tank, a sludge-contaminated liquid collection conduit disposed externally of said tank on a level with the upper portion of said tank and having a length exceeding the length of said tank, said collection conduit extending from a sludge-collecting location remote from said tank to a connection with said tank on one side of said tank, a sludge discharge conduit extending upwardly out of said tank on another side of said tank to a sludge disposal station disposed externally of said tank, and a single endless flight conveyor mounted in said conduits and tank and extending through said collection conduit downwardly through the lower portion of said tank and upwardly through said discharge conduit to said sludge disposal station and returning to said collection conduit.

HENRY W. HAPMAN.

REFERENCES CITED

The following references are of record in the file of this patent:

UNITED STATES PATENTS

| Number | Name | Date |
| --- | --- | --- |
| 918,054 | Jackson | Apr. 13, 1909 |
| 941,918 | Green | Nov. 30, 1909 |
| 1,057,154 | Imhoff | Mar. 25, 1913 |
| 1,337,215 | Fowler | Apr. 20, 1920 |
| 1,845,024 | Kivari | Feb. 16, 1932 |
| 1,957,168 | Hyde | May 1, 1934 |
| 2,126,228 | Streander | Aug. 9, 1938 |
| 2,281,826 | Camp | May 5, 1942 |
| 2,322,017 | Hartman | June 15, 1943 |

FOREIGN PATENTS

| Number | Country | Date |
| --- | --- | --- |
| 531,865 | Germany | Aug. 19, 1951 |